US011227295B2

(12) United States Patent
Pickering et al.

(10) Patent No.: US 11,227,295 B2
(45) Date of Patent: Jan. 18, 2022

(54) METHODS AND SYSTEMS FOR GENERATING AN AGGREGATED DATA STREAM

(71) Applicant: Kalibrate Technologies Limited, Manchester (GB)

(72) Inventors: Benjamin Pickering, Southport (GB); Gareth Owen, Saddlesworth (GB)

(73) Assignee: Kalibrate Technologies Limited, Manchester (GB)

( * ) Notice: Subject to any disclaimer, the term of this patent is extended or adjusted under 35 U.S.C. 154(b) by 206 days.

(21) Appl. No.: 16/223,717

(22) Filed: Dec. 18, 2018

(65) Prior Publication Data

US 2020/0193457 A1    Jun. 18, 2020

(51) Int. Cl.
*G06Q 30/02* (2012.01)
*G06F 17/18* (2006.01)
*G06N 7/00* (2006.01)

(52) U.S. Cl.
CPC ......... *G06Q 30/0201* (2013.01); *G06F 17/18* (2013.01); *G06N 7/00* (2013.01); *G06Q 30/0206* (2013.01)

(58) Field of Classification Search
None
See application file for complete search history.

(56) References Cited

U.S. PATENT DOCUMENTS

| 6,072,248 | A | 6/2000 | Muise et al. |
| 7,108,178 | B1 | 9/2006 | Choi |
| 8,370,280 | B1 | 2/2013 | Lin et al. |
| 8,812,417 | B2 | 8/2014 | Martinez et al. |
| 9,129,219 | B1 | 9/2015 | Robertson et al. |
| 9,489,630 | B2 | 11/2016 | Achin et al. |

(Continued)

FOREIGN PATENT DOCUMENTS

WO    2014075108 A2    5/2014

OTHER PUBLICATIONS

Ashvin Kochak, et al., "Demand Forecasting Using Neural Network for Supply Chain Management", International Journal of Mechanical Engineering and Robotics Research, vol. 4, No. I, Jan. 2015, pp. 96-104.

(Continued)

*Primary Examiner* — Sujay Koneru
(74) *Attorney, Agent, or Firm* — Michael Best & Friedrich LLP (57) ABSTRACT

Methods and systems for data modelling. One method includes receiving a data stream including a first plurality of data points, aggregating the first plurality of data points to a second plurality of data points including values at a first frequency, and building, with at least one electronic processor, a first model based on the second plurality of data points, wherein the first model is configured to generate data values at the first frequency. The method also includes accessing a second model based on a third plurality of data points, wherein the second model is configured to generate data values at a second frequency shorter than the first frequency, generating a first data output using the first model, generating a second data output using the second model, multiplying the first data output by the second data output to generate a third data output, and outputting the third data output for display.

17 Claims, 4 Drawing Sheets

(56) References Cited

U.S. PATENT DOCUMENTS

| | | | |
|---|---|---|---|
| 9,697,469 B2 | 7/2017 | McMahon et al. | |
| 2007/0078748 A1* | 4/2007 | Creed | G06Q 40/04 |
| | | | 705/37 |
| 2013/0091046 A1* | 4/2013 | Benbrahim | G06Q 40/04 |
| | | | 705/37 |
| 2014/0115602 A1* | 4/2014 | Colligan | G06Q 30/06 |
| | | | 718/105 |
| 2014/0324532 A1* | 10/2014 | Ghosh | G06Q 30/0202 |
| | | | 705/7.31 |
| 2014/0351011 A1 | 11/2014 | Wang et al. | |
| 2015/0081491 A1* | 3/2015 | Brereton | G06Q 40/12 |
| | | | 705/35 |
| 2015/0134413 A1 | 5/2015 | Deshpande et al. | |
| 2016/0055426 A1 | 2/2016 | Aminzadeh et al. | |
| 2018/0204233 A1 | 7/2018 | Binkiewicz et al. | |
| 2020/0279212 A1* | 9/2020 | Kubota | G06Q 10/08 |

OTHER PUBLICATIONS

Irem Islek, "A Decision Support System for Demand Forecasting based on Classifier Ensemble", Communication papers of the Federated Conference on Computer Science and Information Systems, 2017, pp. 35-41, vol. 13.
International Search Report with Written Opinion for related Application No. PCT/GB2019/053573 dated Mar. 4, 2020 (12 pages).
International Search Report and Written Opinion for Application No. PCT/GB2020/050453 dated Apr. 3, 2020 (13 pages).

* cited by examiner

METHODS AND SYSTEMS FOR GENERATING AN AGGREGATED DATA STREAM

TECHNICAL FIELD

Embodiments described herein relate to systems and methods for aggregating communicated data to address data storage and data processing inefficiencies.

BACKGROUND

The modern world is reliant upon data transmissions between devices and processing of such data, all of which relies on data storage and computation costs. Reducing these costs sometime affect the usefulness of the data processing. For example, storage and computation costs may be reduced by processing fewer data points. However, using fewer data points may reduce the accuracy or useful of the resulting processed data. For example, a particular data parameter may only be recorded every hour, every two hours, every four hours, once daily, or the like. Similarly, related data may be recorded at different frequencies. In particular, providers of a product or service (referred to herein as an "item") may set prices for the item for different segments of the day. For example, one set of prices may be active from 8 a.m. to 12 p.m., a different set of prices may be active from 12 p.m. to 2 p.m., and so on. These segments may be referred to as "pricing periods," wherein a price is set for a pricing period and remains static until the next period. Therefore, there can be multiple pricing periods within a day and each pricing period may have a different length. For example, some pricing periods may last two hours while other pricing periods may last one hour or four hours. Also, although the pricing periods within a day may be the same day-to-day, the pricing periods may vary based on the day of the week or whether the day is a weekday or a weekend day.

SUMMARY

In some situations, it may be difficult to build a model when a data stream does not include regularly-spaced observations as many modelling techniques require regularly-spaced observations.

One approach to this problem builds a model using observations aggregated to the lowest common multiple of time across periods. For example, observations recorded in a data stream may be aggregated to one observation per time period, such one observation per hour. With these aggregations, a model can be developed using the regular observations, such as a model for forecasting a future observation. For example, when the observations include prices and sales for a product or service (referred to herein as an "item"), the observations may be aggregated to hourly observations, which can then be used to build a model for forecasting sales for the item at a specified price at hourly increments. These hourly forecasts can also be summed to generate a forecast for a particular period, such as a day, multiple days, a portion of a day, or the like.

This approach, however, may suffer from many disadvantages. For example, a small amount of aggregation (aggregating fewer observations together) means that the signal-to-noise ratio of the data may be relatively low compared to a model generated at a higher level of aggregation (aggregating more observations together), such as a daily model. Consequently, the more granular the aggregated data, which provides more granular forecasts, the less accurate the resulting model may be than a model built using data with higher levels of aggregation, such as daily aggregations. For example, a model built using aggregated hourly observations (a hourly model) may provide more granular predictions for future observations than a model built using aggregated daily observations (a daily model), but the hourly model may be less accurate than the daily model due to a relatively larger amount of noise in the hourly-aggregated data. The hourly model also suffers from increased storage costs as compared to a daily model since the smaller the amount of aggregation, the more data points that need to be generated and stored to build the model. The more data points used to generate a model also increases the processing resources needed to generate the model.

Accordingly, to address these and other problems with existing modelling techniques, embodiments described herein provide systems and methods for aggregating data received as part of a data stream and building models using such data without the accuracy degradation and storage costs experienced by existing techniques. For example, within the context of pricing and sales data (provided herein as one example), a model of daily sales for an item (using data aggregation of recorded pricing data) can be combined with a separate model of intra-day demand patterns for the item. In some embodiments, the demand patterns are obtained through pooling transactional sales volumes across a historical data range (and potentially multiple locations).

For example, some embodiments provide a method of data modelling. The method includes receiving a data stream, wherein the data stream comprises a first plurality of data points, and aggregating the first plurality of data points to a second plurality of data points, wherein the second plurality of data points include values at a first frequency. The method also includes building, with at least one electronic processor, a first model based on the second plurality of data points, the first model configured to generate data values at the first frequency and accessing a second model based on a third plurality of data points, the second model configured to generate data values at a second frequency shorter than the first frequency. In addition, the method includes generating a first data output using the first model, generating a second data output using the second model, multiplying the first data output by the second data output to generate a third data output, and outputting the third data output for display.

Other embodiments provide a system for data modelling. The system includes at least one electronic processor configured to receive a data stream, wherein the data stream comprises a first plurality of data points, aggregate the first plurality of data points to a second plurality of data points, wherein the second plurality of data points include values at a first frequency, and build a first model based on the second plurality of data points, the first model configured to generate data values at the first frequency. The at least one electronic processor is also configured to access a second model based on a third plurality of data points, the second model configured to generate data values at a second frequency shorter than the first frequency, generate a first data output using the first model, generate a second data output using the second model, multiply the first data output by the second data output to generate a third data output, and output the third data output for display.

Still other embodiments provide non-transitory computer-readable medium storing instructions executable by at least one electronic processor to perform a set of functions. The set of functions includes receiving a data stream, wherein the data stream comprises a first plurality of data points, aggregating the first plurality of data points to a second plurality of data points, wherein the second plurality of data points include values at a first frequency, and building a first model based on the second plurality of data points, the first model configured to generate data values at the first frequency. The set of functions also includes accessing a second model based on a third plurality of data points, the second model configured to generate data values at a second frequency shorter than the first frequency, generating a first data output using the first model, generating a second data output using the second model, multiplying the first data output by the second data output to generate a third data output, and outputting the third data output for display.

BRIEF DESCRIPTION OF THE DRAWINGS

Embodiments will now be described, by way of example, with reference to the accompanying drawings, in which.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
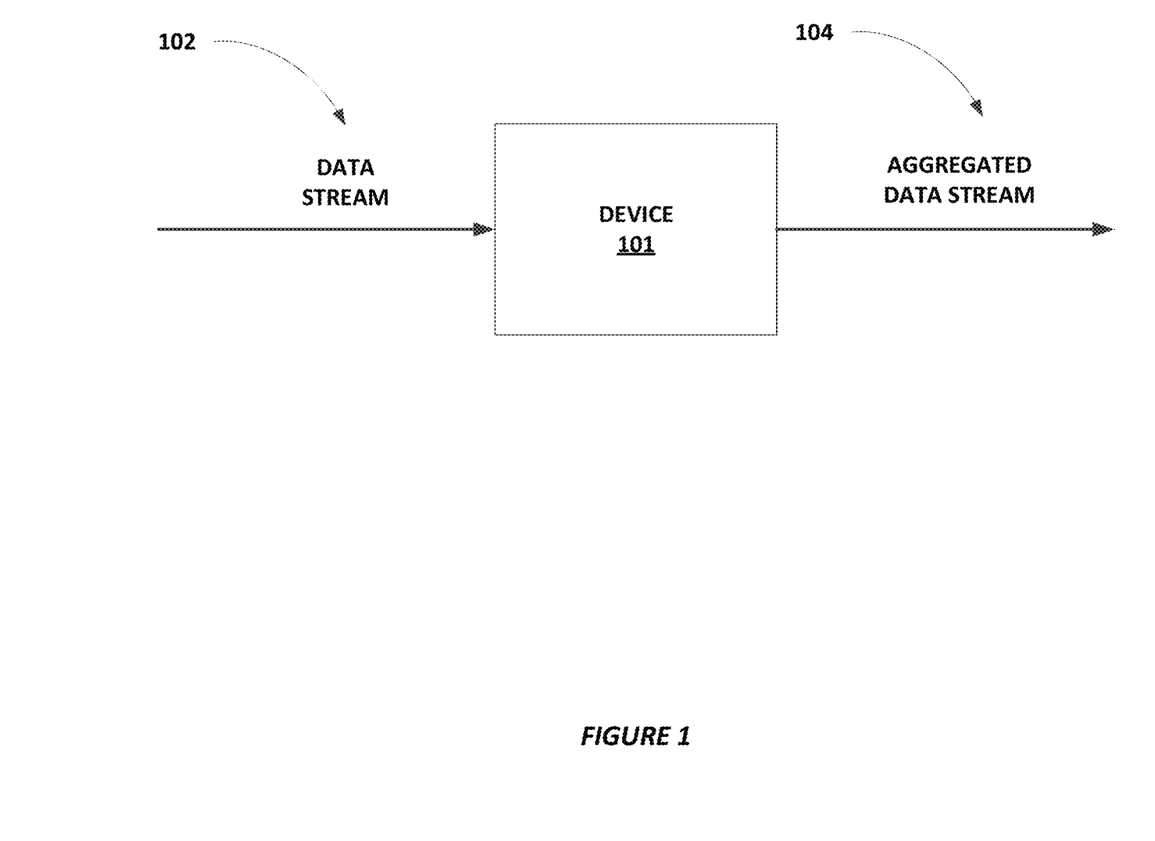
FIG. 1 is a schematic illustration of a system according to an embodiment.

Referring to FIG. 1, a device 101 is arranged to receive a data stream 102. The device 101 may be any type of computing device, for example, a server, a personal computer, a laptop, a smartphone, a tablet, or other suitable processing device. The device 101 may receive the data stream 102 from a second device (not shown in FIG. 1), which may be another computing device, a sensor, or the like. One or more intermediary devices may also exist between the second device (the source of the data stream 102 or a portion thereof) and the device 101. In some embodiments, the device 101 receives the data stream 102 through one or more wired or wireless connections, such as a network such as the Internet. In other embodiments, the device 101 receives the data stream 102 through a local transfer, for example, via a universal serial bus (USB) port of the device 101.

The data stream 102 may be any type of data. For example, the data stream 102 may be temporal or sequential data such as video data, audio data, image data, sensor data, an electronic document, financial data such as pricing and sales data, or any other type of suitable data recorded at various frequencies (a static frequency or a varying frequency that creates missing data points as described above).

As described in more detail below, the device 101 is configured to process the data stream 102 to generate an aggregated data stream 104, which includes aggregated data points. As also described in detail below, the device 101 may use the aggregated data point to generate a model, which may be used to forecast data (in combination with another model). It should be understood that the device 101 generating the aggregated data stream 104 may be configured to output the aggregated data stream 104 for use by one or more other devices to generate the models and forecasts described herein.

Figure 2:
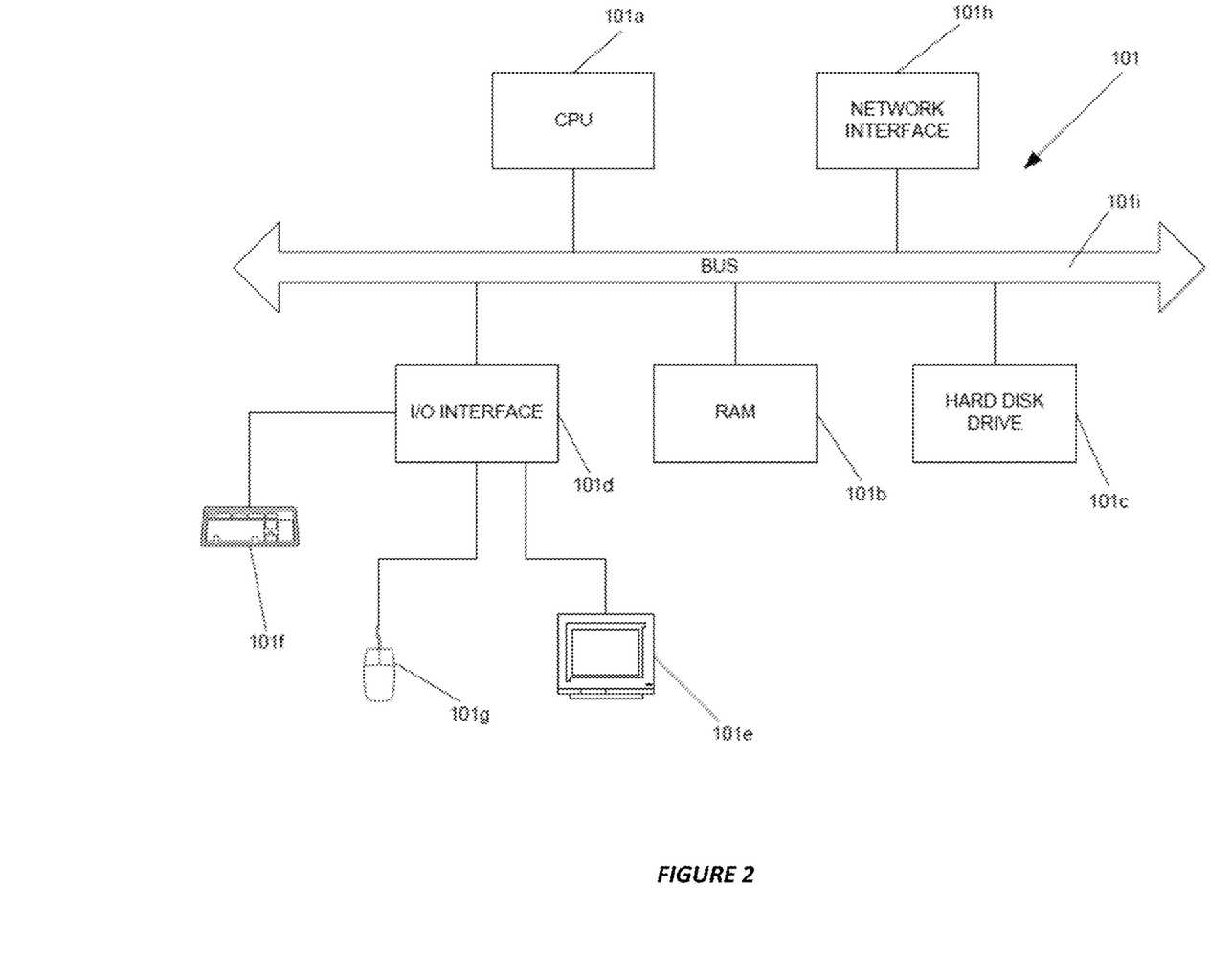
FIG. 2 is a schematic illustration of a device of the system of FIG. 1 in more detail according to an embodiment.

FIG. 2 illustrates the device 101 of FIG. 1 in further detail. As illustrated in FIG. 2, the device 101 comprises an electronic processor 101a (for example, a central processing unit (CPU) that is configured to read and execute instructions stored in a volatile memory 101b, which can take the form of a random access memory. The volatile memory 101b includes non-transitory computer-readable medium and stores instructions for execution by the electronic 101a and data used by those instructions. For example, in use, the data stream 102 may be stored in volatile memory 101b.

The device 101 further comprises non-volatile storage, such as a hard disc drive 101c. In some embodiments, the data stream 102 (and/or the aggregated data stream 104) is stored on the hard disc drive 101c. The device 101 further comprises an input/output (I/O) interface 101d to which are connected peripheral devices used in connection with the computer 101. For example, the device 101 may communicate (through the I/O interface 101d) with a display 101e configured to display output from the device 101. In some embodiments, the device 101 also communicates (through the I/O interface 101d) with one or more input devices. Such input devices may include a keyboard 101f, a mouse 101g, or the like, which allow interaction with the device 101. The one or more input devices may also include a port for receiving a memory device, such as a USB port. A network interface 101h also allows the device 101 to be connected to an appropriate computer network so as to receive and transmit data from and to other computing devices. For example, in some embodiments, the computer 101 receives the data stream 102 as described above over the network interface 101h. In some embodiments, as illustrated in FIG. 2, the electronic processor 101a, the memory 101b, the I/O interface 101d, and network interface 101h communicate via a bus 101i. It should be understood that the device 101 may include different or additional components than those illustrated in FIG. 2 in various configuration. Also, in some embodiments, the functionality described herein as being performed by the device 101 may be performed in a distributed nature using a plurality of devices (such as a cloud environment or distributing computing environment), each of which may include similar components as the device 101 as described herein.

The device 101 (the electronic processor 101a) executes instructions stored in the memory 101b to perform various functions, including the functions described herein. For example, FIG. 3 is a flow chart illustrating processing performed by the device 101, including the generation of a forecasting model using aggregated data.

Figure 3:
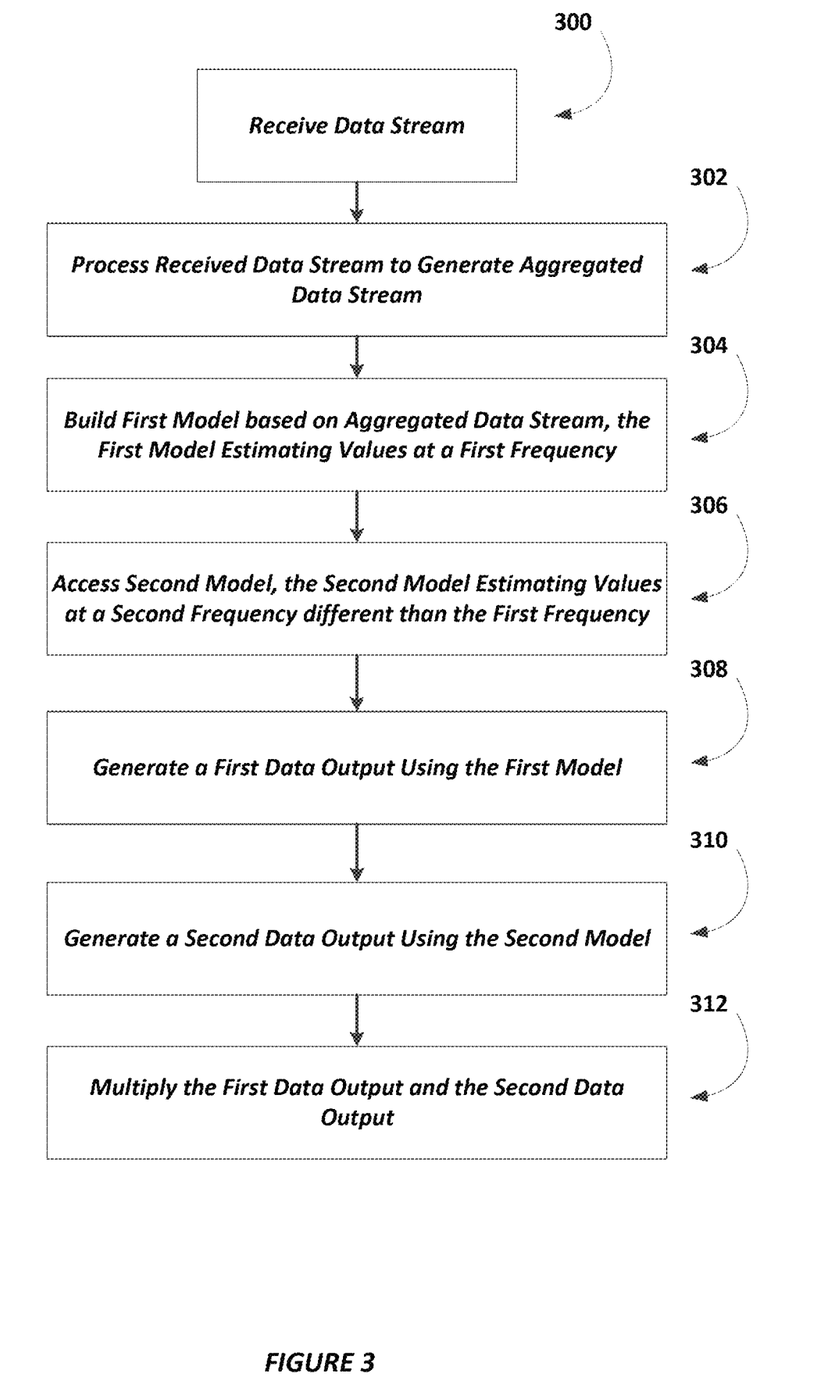
FIG. 3 is a flowchart showing processing performed by the device of FIG. 2.

As illustrated in FIG. 3, the device 101 receives the data stream 102 (at block 300) and processes the data stream 102 to aggregate data points included in the data stream 102 to create a regular (in terms of frequency or interval) set or stream of data points (an aggregated data stream 104) (at block 302). For example, in some embodiments, the aggregated data stream 104 includes a set or stream of data points at a regular frequency, such as one data point (observation) per day. In some embodiments, the data points included in the aggregated data stream 104 include an average of data points included in the original data stream during an interval. For example, for a daily aggregation, each data point in the aggregated data stream 104 represents an average of data points (for example, an average of prices) included in the original data stream for a particular day.

In some embodiments, when performing data aggregation and multiple data points overlap with an aggregation-level period (for example, multiple different prices within a single day), the aggregated data point for the aggregation-level period is calculated as the weighted average of the overlapping data points, where the weight for each data point is the length of time for which it overlaps the aggregated-level period. For example, assuming the aggregation-level period is one day, consider the following table of data points (prices) active within a given day, pre-aggregation:

| Price | Time Active | Weighting |
|-------|-------------|-----------|
| 2.939 | 00:00-08:00 | 480 |
| 3.039 | 08:00-10:00 | 120 |
| 3.019 | 10:00-15:00 | 300 |
| 3.049 | 15:00-00:00 | 540 |

In this example, the single aggregated data point (price) for this day is then calculated as:

$$((2.939 \times 480) + (3.039 \times 120) + (3.019 \times 300) + (3.049 \times 540)) \times \frac{1}{480 + 120 + 300 + 540} = 3.00525 \approx 3.005.$$

The device 101 uses the aggregated data stream 104 to build a first model associated with a first frequency (at block 304). For example, when the aggregated data stream 104 includes daily data points of prices for an item, the device 101 builds a model for forecasting daily sales for the item. In particular, in this situation, the aggregated prices are combined with daily sales to build the first model. Prices and sales can be received as either part of the same data stream or in multiple streams, such as separate streams. In some embodiments, the aggregated data stream 104 includes data points for a particular location providing the item (a location where sales forecasting is desired). As noted above, aggregating data points reduces storage requirements for the data stream (as the number of data points are reduced via the aggregation) and may reduce processing resources needed to process the aggregated data points included in the aggregated data stream 104 as compared to processing the larger number of data points included in the original data stream 102. For example, a daily model incurs a storage cost that is approximately 24 times smaller than the cost of storing an hourly model and also experiences reduced processing time as compared to an hourly model.

In some embodiments, the second model (a daily sales model) is generated through the optimisation of a regularised objective function:

$$\min_{\beta \in \mathbb{R}^p} \left\{ \frac{1}{n} \|y - X\beta\|_2^2 + \lambda f(\beta) \right\}$$

where y is the vector of aggregated sales values (or aggregated observations of the quantity we wish to forecast, in general), X is the matrix of aggregated prices (or any regressors, in general), β is the vector of parameters which defines the daily model, λf(β) is a regularisation term, for example, an $L_1$-norm of the β vector, n is the number of aggregated observations, and p is the number of regressors.

The device 101 also generates (or accesses) a second model associated with a second frequency different (for example, greater than) than the first frequency of the first model (at block 306). The second frequency may be regular or irregular, including a frequency representing data points at a repeated pattern. For example, continuing with a pricing example, pricing data points may have a defined pattern each day of the week wherein the data points during each day occur at a defined pattern (for example, 00:00-09:00, 09:00-16:00, 16:00-00:00). In some cases the pricing periods will be the same for each day-of-week but in other cases, the pricing periods or pattern may differ for one or more days of the week.

In some embodiments, the second model is estimated by pooling a set of transactional sales with associated intra-day timestamps and calculating the empirical cumulative distribution function of the amount of sales occurring within the 24-hour day. This can then be used to describe the proportion of daily demand that occurs between any two times of a day.

The determination of the second frequency for the pricing periods may be set by a user. Alternatively or in addition, 'optimal' pricing periods may be estimated. To estimate these optimal pricing periods, a Gaussian-Uniform mixture model is fitted to the pooled set of intra-day transactional sales using the expectation-maximisation algorithm. In general, each Gaussian distribution represents a 'spike' in the sales demand, and the uniform distribution represents the background level of sales. Thus, the different optimal pricing periods can be defined by the locations at which each respective latent distribution (the Gaussian and Uniform distributions) has maximal conditional likelihood.

Figure 4:
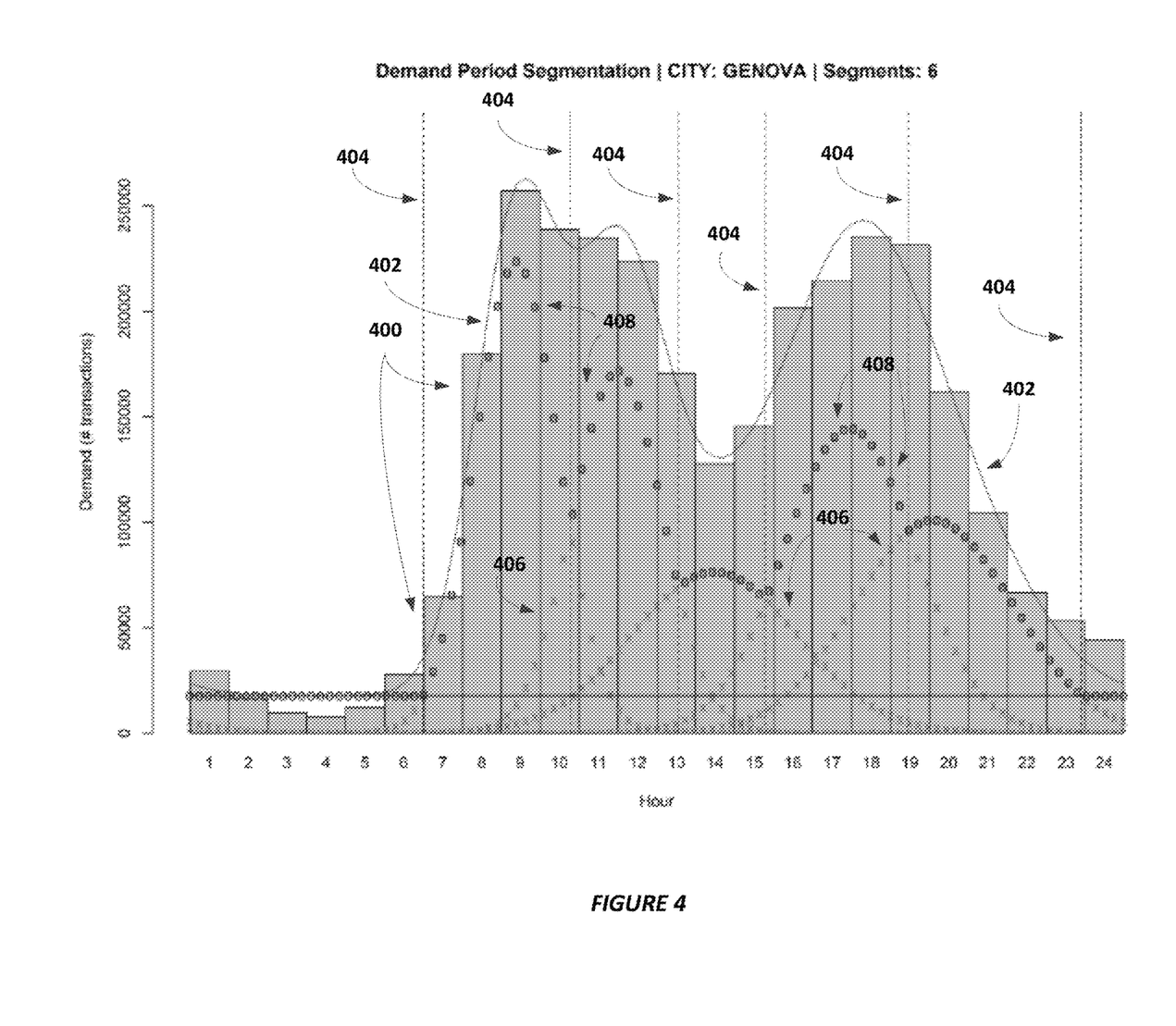
FIG. 4 illustrates an example of intra-day demand patterns obtained from pooling of transactional sales volumes across a historical date range.

For example, when the data stream 102 includes prices for an item and the first model includes a daily model of sales, the second model may represent intra-day demand patterns for the item. For example, FIG. 4 illustrates an example of intra-day demand patterns obtained from sales volumes across a historical data range. The shaded bars 400 represent the pooled transactional sales volumes and the intra-day demand pattern generated from the pooled data is overlaid on the bars as the solid line 402. The dashed vertical lines 404 in FIG. 4 represent time periods.

The data points 406 (represented as "x's" in FIG. 4) represent different Gaussian and Uniform distributions estimated as composites of the intra-day sales demand. The data points 408 (represented as "o's" in FIG. 4) indicate the distribution having the largest conditional probability at each time point (each hour in this example). The period between the 'crossover' to another distribution being the most impactful is defined as a single pricing period. Hence, in this example, six pricing periods have been estimated (the pricing period at 24 is assumed to wrap-around to 1:00 a.m.).

In some embodiments, the shaded bars represent transactional sales volumes for multiple locations (for example, multiple sales sites), which may or may not include the location associated with the first model. Accordingly, despite modelling at a low level of granularity (intra-day), the second model benefits from a reasonably strong signal-to-noise ratio due to the pooling of transactional sales. This model also incurs only a marginal storage cost. For example, as described below, the storage cost is marginal because in some embodiments the second model can be stored as an empirical cumulative density function, which costs significantly less storage-wise than an intra-day (for example, hourly) aggregated model.

Thus, to obtain a sales volume estimate for a given pricing period at a proposed price value, the device 101 (a) generates a daily sales forecast for the day in which the pricing period is occurring using the first model generated based on the aggregated data points, with the daily price set to the proposed price value of the period (at block 308), (b) estimates the proportion of daily demand that occurs within the given pricing period using the second model (the intra-day demand model) (at block 310), and (c) multiplies the "daily" forecast generated in (a) by the demand proportion estimated in (b) to obtain the overall estimated sales forecast for this pricing period assuming the proposed price value (at block 312). An example of multiplication for apportionment of daily forecast to multiple pricing periods is provided in the below table:

| Daily Forecast Value | Pricing Period | Proportion of Daily Demand in Pricing Period | Pricing Period Forecast |
|---|---|---|---|
| 506.4 | 0000-0700 | 0.125 | 63.3 (506.4 * 0.125) |
| | 0700-1300 | 0.487 | 246.6168 |
| | 1300-1900 | 0.293 | 148.3752 |
| | 1900-0000 | 0.095 | 48.1080 |

The device 101 can output the overall estimated sales forecast for this pricing period assuming the proposed price value, such as on the display device 101e communicating with the device 101. Alternatively or in addition, the device 101 can incorporate the forecast in a report or other documentation, calculate further values from the forecast, transmit the forecast to another device (for example, over a computer network), or a combination thereof.

One advantage of the methods and systems described herein over an aggregated hourly model as described above in the Summary section is the simultaneously improvement in accuracy (gained through the use of daily data to generate the first model to achieve improved signal-to-noise ratio as compared to using hourly data), and the vastly reduced storage cost since it is now only necessary to store daily-aggregated data for use in generating the daily model (rather than hourly-aggregated data) and the intra-day demand model (which, in some embodiments, may be represented by an empirical cumulative distribution function).

Although embodiments have been described herein in terms of generating a sales forecast for a given pricing period to estimate sales volume in a future pricing period under the assumption of a given set of prices, the systems and methods described herein are not limited to this context or purpose. Rather, the systems and methods described herein can be used to generate forecasts or predictions for any type of data by using a first model generated based on data representing a first time period and a second model associated with a second time period shorter than the first time period. For example, one aspect of the above-described model is the use of data to build an 'aggregate-level model' to generate a forecast of some quantity at this high level of time-aggregation, then combining this 'aggregate-level model' with the 'apportionment model' to apportion this forecast into multiple (smaller) forecasts for more granular intervals of time. This apportionment model can be built using any data desired, which may or may not be similar to the data used to build the aggregate-level model. Hence, one feature of the above-described model is the use of two models (each being built using data corresponding to different frequencies of time) to avoid having to build a single model at the low-aggregation level, along with all the benefits this modelling technique brings.

Furthermore, although specific embodiments of the invention have been described above, it will be appreciated that various modifications can be made to the described embodiments without departing from the spirit and scope of the present invention. That is, the described embodiments are to be considered in all respects exemplary and non-limiting. In particular, where a particular form has been described for particular processing, it will be appreciated that such processing may be carried out in any suitable form arranged to provide suitable output data.

What is claimed is:
1. A method of data modelling, the method comprising:
receiving, with at least one electronic processor, a data stream, wherein the data stream comprises a first plurality of data points, wherein the first plurality of data points includes values at varying intervals;
aggregating, with the at least one electronic processor, the first plurality of data points to a second plurality of data points, wherein the second plurality of data points include values at a first frequency, wherein the first frequency is a regular frequency;

storing, on a non-volatile storage medium, the second plurality of data points, wherein the second plurality of data points incurs a storage cost less than the first plurality of data points;

building, with the at least one electronic processor, a first model based on the second plurality of data points, the first model configured to generate data values at the first frequency;

accessing, with the at least one electronic processor, a second model based on a third plurality of data points, the second model configured to generate data values at a second frequency shorter than the first frequency, wherein the second frequency is an irregular frequency;

generating, with the at least one electronic processor, a first data output using the first model;

generating, with the at least one electronic processor, a second data output using the second model;

multiplying, with the at least one electronic processor, the first data output by the second data output to generate a third data output; and outputting, with the at least one electronic processor, the third data output for display;

wherein aggregating the first plurality of data points includes calculating a weighted average of overlapping data points included in the first plurality of data points; and wherein a weight for each data point is a length of time for which the data point overlaps an aggregated-level period.

2. The method of claim 1, wherein the first plurality of data points includes item prices.

3. The method of claim 2, wherein the second model represents demand for the item.

4. The method of claim 3, wherein the first plurality of data points includes item prices for a first location.

5. The method of claim 4, wherein the second model is generated based on demand for the item for the first location and a second location.

6. The method of claim 1, wherein the first model is configured to generate a daily sales forecast for an item at a proposed price for a proposed day.

7. The method of claim 6, wherein the second model is configured to generate an intra-day demand for the item at the proposed price.

8. The method of claim 7, wherein the third data output includes an estimated sales volume at the proposed price value for a pricing period occurring within the proposed day.

9. The method of claim 1, further comprising estimating the second frequency using a Gaussian-Uniform mixture model fitted to a set of data points using an expectation-maximisation algorithm.

10. The method of claim 1, further comprising:
estimating the second model by pooling a set of transactional sales with associated intra-day timestamps and calculating an empirical cumulative distribution function of an amount of sales occurring within a 24-hour period.

11. A system for data modelling, the system comprising:
a non-volatile storage medium; and
at least one electronic processor configured to
receive a data stream, wherein the data stream comprises a first plurality of data points, wherein the first plurality of data points include values at varying intervals
aggregate the first plurality of data points to a second plurality of data points by averaging data points included in the first plurality of data points during each interval, wherein the second plurality of data points include values at a first frequency,
store, on the non-volatile storage medium, the second plurality of data points; wherein the second plurality of data points incurs a storage cost less than the first plurality of data points;
build a first model based on the second plurality of data points, the first model configured to generate data values at the first frequency,
access a second model based on a third plurality of data points, the second model configured to generate data values at a second frequency shorter than the first frequency,
generate a first data output using the first model,
generate a second data output using the second model,
multiply the first data output by the second data output to generate a third data output, and
output the third data output for display;
wherein aggregating the first plurality of data points includes calculating a weighted average of overlapping data points included in the first plurality of data points; and
wherein a weight for each data point is a length of time for which the data point overlaps an aggregated-level period.

12. The system of claim 11, wherein the first plurality of data points includes item prices and the second model represents demand for the item.

13. The system of claim 12, wherein the second model is generated based on demand for the item for the first location and a second location.

14. The system of claim 11, further comprising estimating the second frequency using a Gaussian-Uniform mixture model fitted to a set of data points using an expectation-maximisation algorithm.

15. Non-transitory computer-readable medium storing instructions executable by at least one electronic processor to perform a set of functions, the set of functions comprising:
receiving a data stream, wherein the data stream comprises a first plurality of data points, the first plurality of data points includes values at varying intervals;
aggregating the first plurality of data points to a second plurality of data points, wherein the second plurality of data points include values at a first frequency, wherein the first frequency is a regular frequency;
storing, on a non-volatile storage medium, the second plurality of data points, wherein the second plurality of data points incurs a storage cost less than the first plurality of data points;
building a first model based on the second plurality of data points, the first model configured to generate data values at the first frequency;
accessing a second model based on a third plurality of data points, the second model configured to generate data values at a second frequency shorter than the first frequency, wherein the second frequency is an irregular frequency;
estimating the second model by pooling a set of transactional sales with associated intra-day timestamps and calculating an empirical cumulative distribution function of an amount of sales occurring within a 24-hour period;
generating a first data output using the first model; generating a second data output using the second model;

multiplying the first data output by the second data output to generate a third data output; and outputting the third data output for display.

16. The non-transitory computer readable medium of claim 15, wherein the first plurality of data points includes item prices and the second model represents demand for the item, the first model is configured to generate a daily sales forecast for the item at a proposed price for a proposed day, the second model is configured to generate an intra-day demand for the item at the proposed price, and the third data output includes an estimated sales volume at the proposed price value for a pricing period occurring within the proposed day.

17. The non-transitory computer readable medium of claim 15, wherein the set of functions further comprises estimating the second frequency using a Gaussian-Uniform mixture model fitted to a set of data points using an expectation-maximisation algorithm.

* * * * *